United States Patent
Kim et al.

(10) Patent No.: US 9,386,538 B2
(45) Date of Patent: Jul. 5, 2016

(54) METHOD AND DEVICE FOR CONTROLLING TRANSMISSION POWER IN WIRELESS COMMUNICATION SYSTEM

(71) Applicant: LG ELECTRONICS INC., Seoul (KR)

(72) Inventors: Kijun Kim, Anyang-si (KR); Suckchel Yang, Anyang-si (KR); Dongyoun Seo, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/413,983

(22) PCT Filed: Jul. 12, 2013

(86) PCT No.: PCT/KR2013/006264
§ 371 (c)(1),
(2) Date: Jan. 9, 2015

(87) PCT Pub. No.: WO2014/010987
PCT Pub. Date: Jan. 16, 2014

(65) Prior Publication Data
US 2015/0208361 A1 Jul. 23, 2015

Related U.S. Application Data

(60) Provisional application No. 61/671,077, filed on Jul. 12, 2012.

(51) Int. Cl.
*H04W 52/24* (2009.01)
*H04W 52/14* (2009.01)
(Continued)

(52) U.S. Cl.
CPC .......... *H04W 52/242* (2013.01); *H04W 52/146* (2013.01); *H04L 5/0007* (2013.01);
(Continued)

(58) Field of Classification Search
CPC ... H04W 24/10; H04W 24/02; H04W 84/045; H04W 24/08; H04W 36/0094; H04W 36/30
See application file for complete search history.

(56) References Cited

U.S. PATENT DOCUMENTS

2005/0201268 A1* 9/2005 Aoki ........................ H04B 7/10
370/208
2008/0280638 A1 11/2008 Malladi et al.
(Continued)

FOREIGN PATENT DOCUMENTS

| KR | 10-2011-0102233 A | 9/2011 |
|---|---|---|
| WO | WO 2012/000551 A1 | 1/2012 |
| WO | WO 2012/060746 A1 | 5/2012 |

OTHER PUBLICATIONS

NTT DOCOMO, "Consideration on the IDLE UE handling on Energy Saving Cell," 3GPP TSG-RAN WG3 Meeting #74, R3-112933, San Francisco, USA, Nov. 14-18, 2011 (downloaded by EPO on Nov. 4, 2011), 2 pages.

*Primary Examiner* — Bobbak Safaipour
(74) *Attorney, Agent, or Firm* — Birch, Stewart, Kolasch & Birch, LLP

(57) ABSTRACT

In an embodiment according to the present invention, a method of controlling transmission power by a terminal in a wireless communication system includes: receiving information on a change in transmission power in a first time section; and estimating path attenuation and performing up-link transmission power control by using the estimated path attenuation, wherein if the estimation of the path attenuation is performed in a second time section following the first time section, information on the change in transmission power is considered when estimating the path attenuation.

14 Claims, 8 Drawing Sheets

(a)

(b)

(51) Int. Cl.
  *H04L 5/00* (2006.01)
  *H04W 52/22* (2009.01)
  *H04W 52/36* (2009.01)

(52) U.S. Cl.
  CPC .......... *H04W52/223* (2013.01); *H04W 52/244* (2013.01); *H04W 52/245* (2013.01); *H04W 52/362* (2013.01)

(56) References Cited

U.S. PATENT DOCUMENTS

| | | |
|---|---|---|
| 2009/0082026 A1 | 3/2009 | Yavuz et al. |
| 2012/0039269 A1 | 2/2012 | Tenny et al. |
| 2012/0327804 A1 | 12/2012 | Park et al. |
| 2015/0072697 A1* | 3/2015 | Shen .................. H04W 16/10 455/450 |

* cited by examiner

METHOD AND DEVICE FOR CONTROLLING TRANSMISSION POWER IN WIRELESS COMMUNICATION SYSTEM

CROSS REFERENCE TO RELATED APPLICATIONS

This application is the National Phase of PCT/KR2013/006264 filed on Jul. 12, 2013, which claims priority under 35 U.S.C. §119(e) to U.S. Provisional Application No. 61/671,077 filed on Jul. 12, 2012, all of which are hereby expressly incorporated by reference into the present application.

TECHNICAL FIELD

The present invention relates to a wireless communication system and more particularly, to a method and apparatus for controlling uplink transmission power, when the transmission power of a cell is changed.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

DISCLOSURE

Technical Problem

An object of the present invention devised to solve the conventional problem is to provide a method for gradually changing transmission power to support on/off of a cell, a method for indicating a change in the transmission power of a cell to a User Equipment (UE), and a method for, when the transmission power of a cell is changed, controlling uplink transmission power at a UE.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for controlling transmission power by a User Equipment (UE) in a wireless communication system includes receiving transmission power change information during a first time period, and estimating a path loss and performing uplink transmission power control using the estimated path loss. If the path loss estimation is performed during a second time period successive to the first time period, the transmission power change information is considered in the path loss estimation.

In another aspect of the present invention, a UE in a wireless communication system includes a reception module and a processor. The processor is configured to receive transmission power change information during a first time period and estimate a path loss and performing uplink transmission power control using the estimated path loss. If the path loss estimation is performed during a second time period successive to the first time period, the processor considers the transmission power change information in the path loss estimation.

The above aspect of the present invention may include the followings.

The transmission power change information may include cell Identifiers (IDs) of one or more cells having transmission power to be changed and power increments/decrements corresponding to the cell IDs.

The second time period may be a time period during which transmission power of a cell indicated by the transmission power change information is changed.

The first time period may be a time period during which the transmission power change information is transmitted repeatedly.

The path loss may be estimated by the following equation PL=referenceSignalPower−higher layer filtered RSRP where referenceSignalPower may be transmission power of a Base Station (BS) and higher layer filtered RSRP may be a filtered value of Reference Signal Received Power (RSRP) measured every RSRP measurement unit time.

referenceSignalPower may be a value indicated by higher-layer signaling and if the path loss estimation is performed during the second time period, the value indicated by the higher-layer signaling may be replaced with a value determined according to the transmission power change information.

If the path loss estimation is performed during the second time period, a filter configuration for higher layer filtered RSRP may be different from a filter configured used when the path loss estimation is performed during the first time period.

If the path loss estimation is performed during the second time period, a filter input value for higher layer filtered RSRP may be a value corrected using the transmission power change information.

If the UE is in a Radio Resource Control (RRC) connected state, the uplink transmission power control may be related to one or more of a Physical Uplink Shared Channel (PUSCH) and a Physical Uplink Control Channel (PUCCH).

If the UE is in an RRC idle state, the uplink transmission power control may be related to transmission power of a preamble on a Physical random Access Channel (PRACH).

The transmission power change information may be transmitted on a paging channel during the first time period.

A transmission power change indicated by the transmission power change information may be a change of Energy Per Resource Element (EPRE) of a Reference Signal (RS) over which RSRP is to be measured.

The transmission power change may be proportional to a change of EPRE of an RS.

Each of the first and second time periods may be an integer multiple of a system information change period.

Advantageous Effects

According to the present invention, an on/off operation of a cell can be supported efficiently. Further, even though the transmission power of a cell is changed, a UE can accurately perform path loss estimation and transmission power control.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)". The name "cell" adopted in the following descriptions may be applied to transmission/reception points such as a base station (or eNB), a sector, a remote radio head (RRH), and a relay, and may be used a general term to identify a component carrier at a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LET—A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 1:
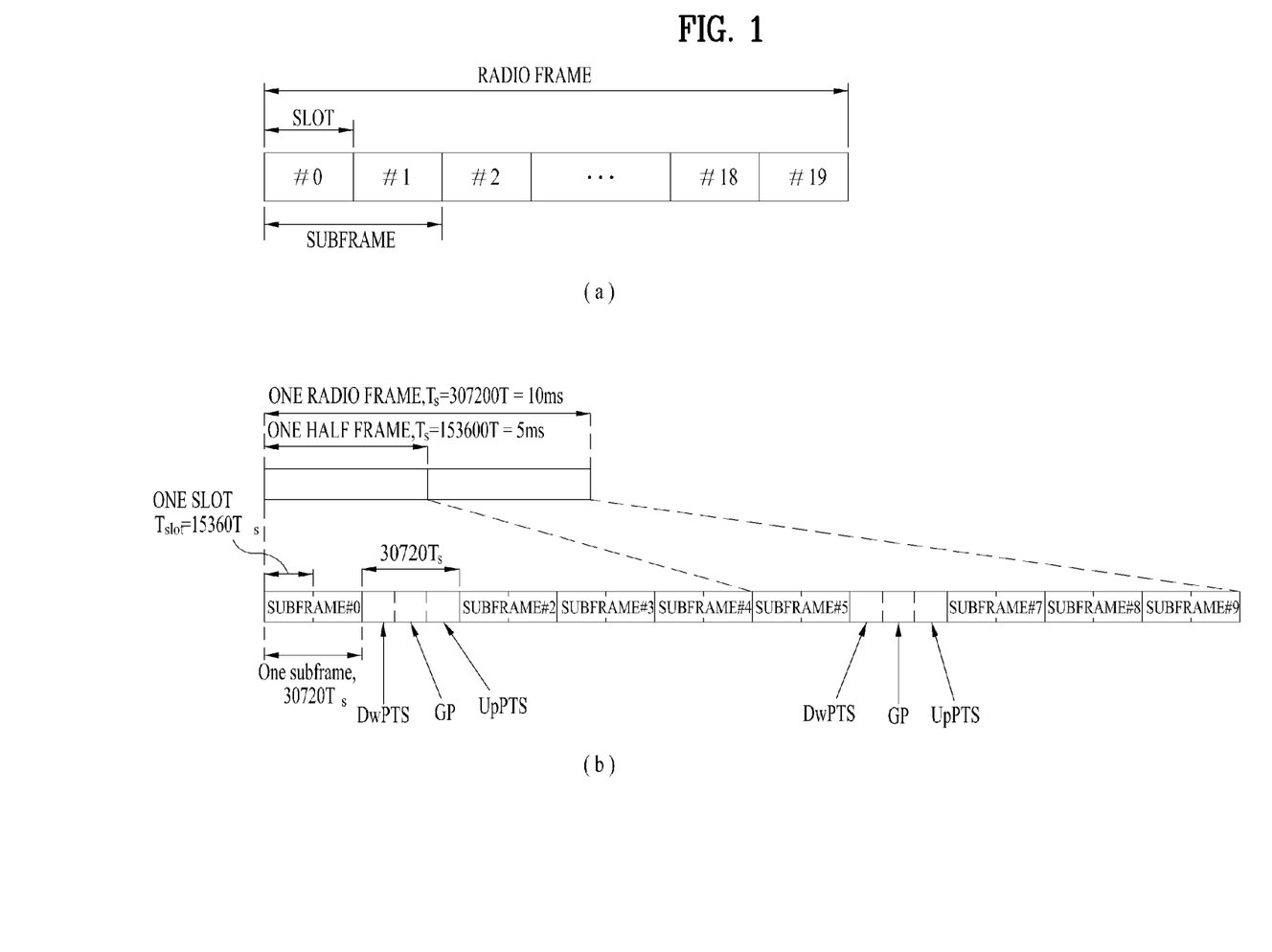
FIG. 1 illustrates a radio frame structure.

FIG. 1(*a*) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
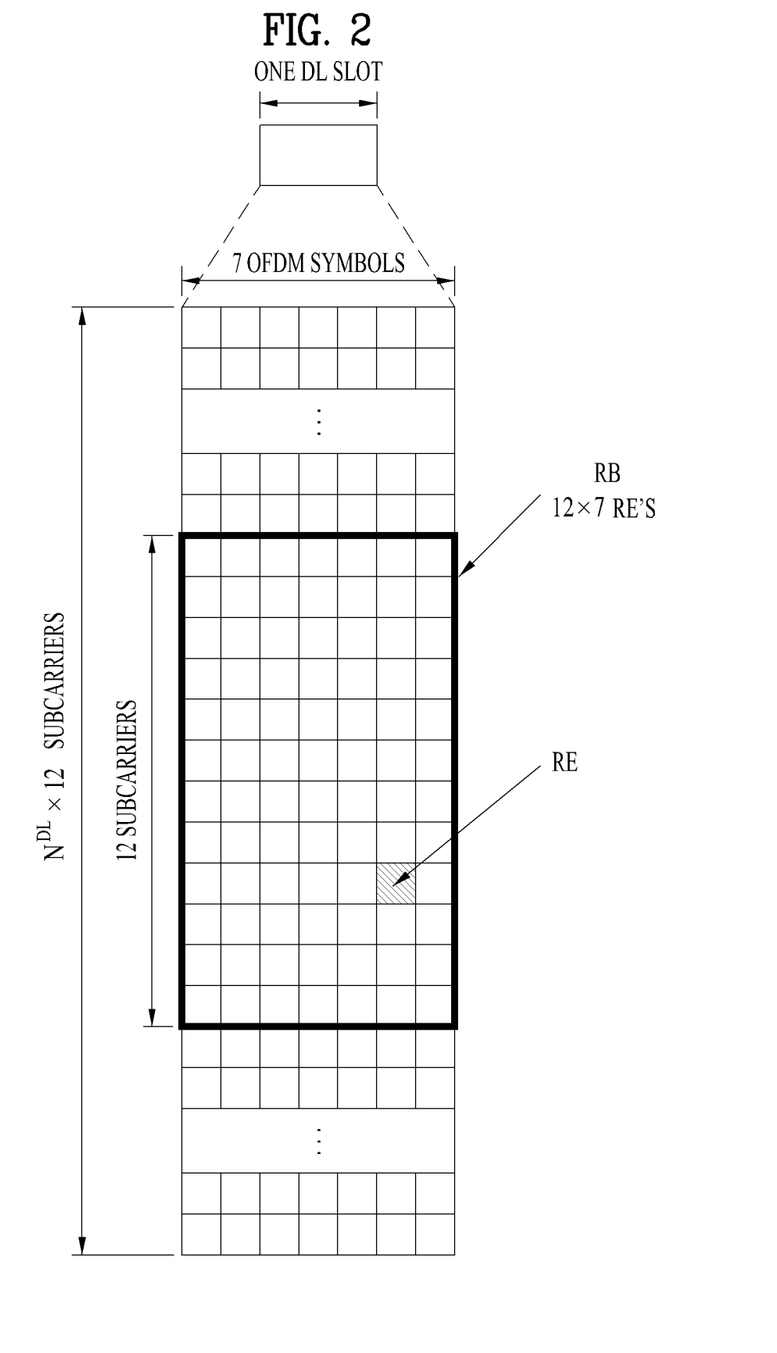
FIG. 2 illustrates a resource grid for the duration of a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
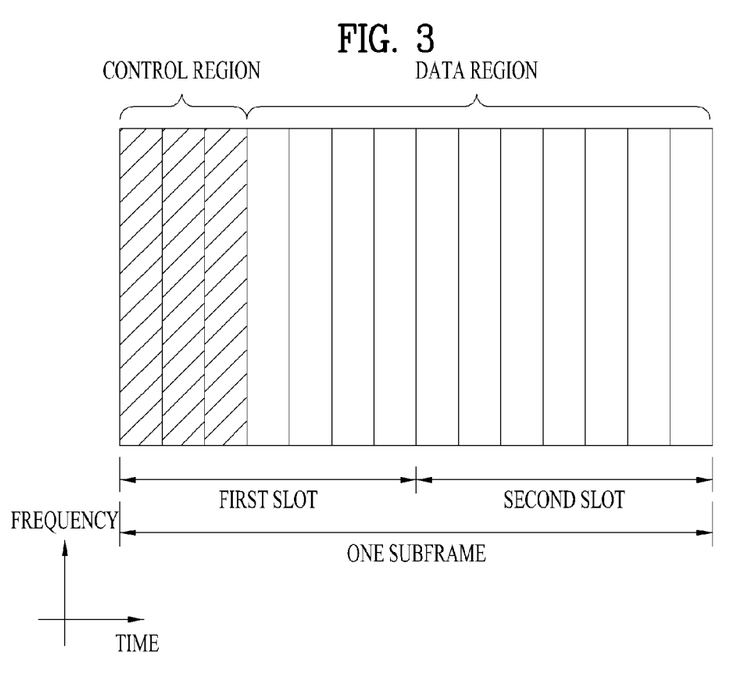
FIG. 3 illustrates a downlink subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
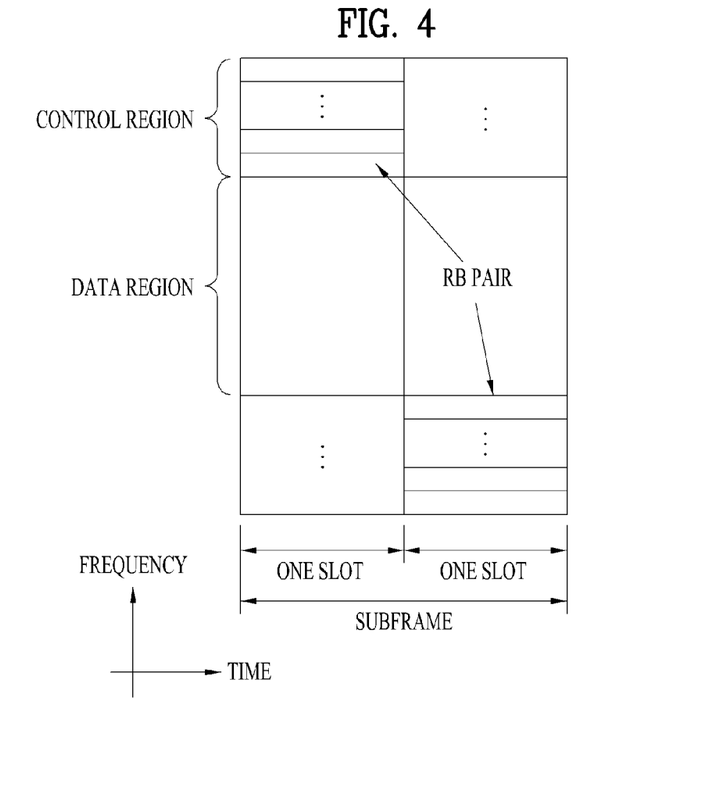
FIG. 4 illustrates an uplink subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

Figure 5:
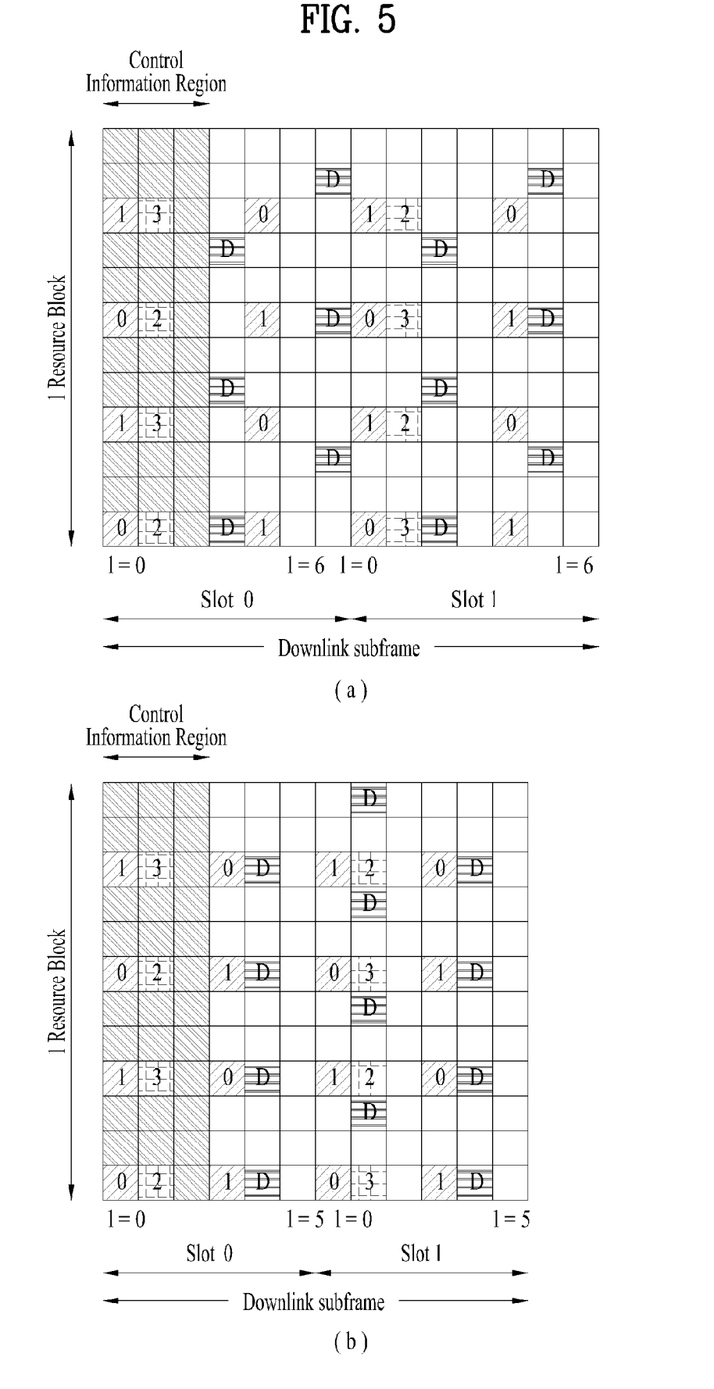
FIG. 5 is a view referred to for describing reference signals.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Measurement/Measurement Report

A measurement report is used for one or more of methods for ensuring the mobility of a UE (e.g., handover, random access, cell search, etc.). Since a measurement report requires more or less coherent demodulation, a UE may report a measurement after acquiring synchronization and physical layer parameters, except for a received signal strength measurement. In concept, measurement reporting covers Radio Resource Management (RRM) measurement such as Reference Signal Received Power (RSRP), Received Signal Strength Indicator (RSSI), and Reference Signal Received Quality (RSRQ), which are measurements of signal strengths of a serving cell and a neighbor cell or signal strengths to total reception power of the serving cell and the neighbor cell, and Radio Link Failure (RLM) measurement which is a link quality measurement of the serving cell for use in determining whether an RLM has occurred.

RSRP is a linear average over the power contributions of REs carrying CRSs on a DL.

RSSI is the linear average of the total received power of a UE, measured over OFDM symbols containing an RS for antenna port 0. The RSSI is a measurement including interference and noise power from neighbor cells. If a specific subframe for RSRQ measurement is indicated by higher-layer signaling, RSSI is measured over all OFDM symbols included in the indicated subframe.

RSRQ is the ratio of N×RSRP/RSSI where N is the number of RBs of an RSSI measurement bandwidth.

Figure 8:
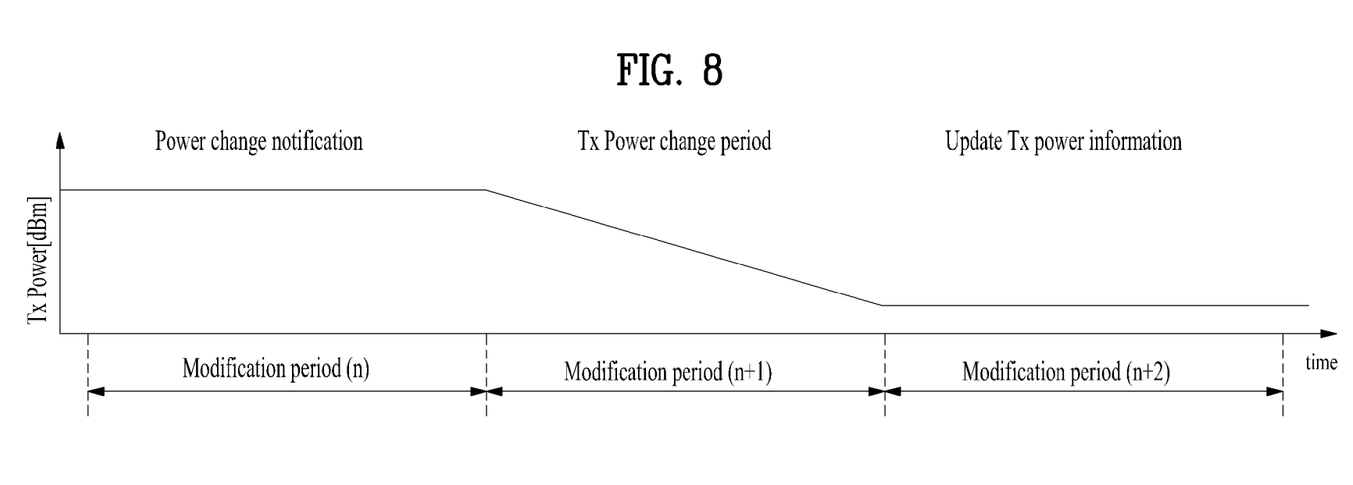
FIG. 8 is a view referred to for describing a change in transmission power according to an embodiment of the present invention.

As noted from the above definition of RSRP, measurement reporting is performed basically using CRSs. However, if cells share the same Physical Cell Identifier (PCID), the cells may not be distinguished by CRSs, as illustrated in FIG. 8(b). As a result, RRM may not be performed on each cell just with a measurement report including a CRS-based RSRP/RSRQ measurement. Accordingly, if cells have the same PCID, additional RSRP/RSRQ measurement reporting may be performed based on CSI-RSs transmitted by the individual cells. To increase the reception accuracy of CSI-RSs from a specific cell, neighbor cells may not transmit signals in REs carrying the CSI-RSs so that the CSI-RSs may be measured more accurately than CRSs although the CSI-RSs are transmitted less frequently than the CRSs. Thus, when cells have different PCIDs, the accuracy of RRM of a network may also be increased by performing CRS-based RSRP/RSRQ measurement reporting and CSI-RS-based RSRP/RSRQ measurement reporting together.

Another main purpose for transmitting a CSI-RS in each cell is Channel State Information (CSI) feedback that a UE performs to help an eNB to determine a rank, a precoding matrix, a Modulation and Coding Scheme (MCS) or Channel Quality Indicator (CQI) for use in DL data transmission from the cell to the UE during scheduling. In Coordinated Multi-Point (CoMP) transmission, the UE should feed back CSI for DLs of cooperative cells as well as a serving cell. Since overhead is too bulky to feed back CSI for all cells of a CoMP cluster including the serving cell of the UE, the UE may be configured to feed back CSI for a part of the cells of the CoMP cluster, which are supposed to perform cooperative scheduling and cooperative data transmission, that is, a CoMP measurement set. Cells having RSRP values equal to or larger than a predetermined value may be selected as a CoMP measurement set for a specific UE. For this purpose, the UE performs RSRP measurement reporting over the cells of a CoMP cluster to which the UE belongs. Or an eNB may indicate configurations of CSI-RSs over which the UE will measure RSRP or RSRQ as a CoMP management set. Then the UE may measure RSRP or RSRQ over CSI-RSs received from the cells of the CoMP management set. If the measurements satisfy a predetermined condition, the UE may report the measurements.

To enable Inter-Cell Interference Coordination (ICIC) between CoMP clusters, a UE measures RSRP over the cells of a neighbor CoMP cluster and reports the measurements so that the network and the UE may determine a cell causing severe interference to the UE and a cell to which the UE causes severe UL interference, among the cells of the neighbor CoMP cluster.

The accuracy and flexibility of RRM of the network may be increased by performing CSI-RS-based RSRP/RSRQ measurement reporting for configuring a CoMP measurement set and performing ICIC along with CRS-based RSRP/RSRQ measurement for mobility management such as a UE's handover.

UL Power Control

In an LTE/LTE-A system, UL power control is used for reliable demodulation of UL control information and data. The UL power control may be classified into Physical Uplink Control Channel (PUCCH) power control, Physical Uplink Shared Channel (PUSCH) power control, and UL Sounding Reference Signal (SRS) power control.

PUCCH power control is determined in consideration of a path loss and the maximum transmission power of a UE in order to enable demodulation of control information transmitted on a PUCCH at a sufficiently low error rate.

Specifically, PUCCH power control may be performed in subframe i of cell c according to the following [Equation 2].

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \quad \text{[Equation 2]}$$

In [Equation 2], $P_{CMAX,c}(i)$ represents the maximum transmission power of a UE, which is the upper limit of a PUCCH power control command.

$P_{0\_PUCCH}$ is a PUCCH transmission power value that an eNB wants to receive. This value is indicated as a UE-specific parameter by higher-layer signaling and determined to be the sum of a nominal power value $P_{O\_NOMINAL\_PUCCH}$ and $P_{O\_UE\_PUCCH}$.

$PL_c$ is a path loss value in cell c, estimated by the UE. The UE may estimate the path loss value by measuring the received power of DL CRSs.

$h(n_{CQI}, n_{HARQ}, n_{SR})$ is a value dependent on a PUCCH format, where $n_{CQI}$ is the number of bits representing channel quality information, $n_{HARQ}$ is the number of HARQ bits, and if subframe i is configured for a Scheduling Request (SR), $n_{SR}$ is 1 and otherwise, $n_{SR}$ is 0. $h(n_{CQI}, n_{HARQ}, n_{SR})$ is dependent on a PUCCH format. Specifically, i) $h(n_{CQI}, n_{HARQ}, n_{SR})$ may be 0 in PUCCH formats 1, 1a, and 1b, ii) if one or more serving cells are used in PUCCH format 1b, $h(n_{CQI}, n_{HARQ}, n_{SR})$ may be $$\frac{(n_{HARQ} - 1)}{2},$$

and iii) if a normal CP is used in PUCCH formats 2, 2a, and 2b, $h(n_{CQI}, n_{HARQ}, n_{SR})$ may be $$10 \log_{10}\left(\frac{n_{CQI}}{4}\right).$$

$\Delta_{F\_PUCCH}(F)$ is a value indicated in consideration of an MCS by higher-layer signaling. This is used to reflect the need for different Signal to Noise Interference Ratios (SINRs) since different numbers of bits per subframe and different error rates are required according to PUCCH formats.

$\Delta_{TxD}(F')$ is a power offset indicated by higher-layer signaling, when a PUCCH is transmitted through two antenna ports. $\Delta_{TxD}(F')$ is dependent on a PUCCH format.

$g(i)$ is a current accumulated value of PDCCH power control states, which is determined by a power value $\delta_{PUCCH}$ corresponding to the value of a Transmit Power Control (TPC) command field included in a Downlink Control Information (DCI) format transmitted on a PDCCH and a PUCCH power control state value $g(i-1)$ of a previous subframe.

If PUCCH transmission is not performed, PUSCH power control may be determined by [Equation 3].

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{[Equation 3]}$$

$P_{CMAX,c}(i)$ represents the maximum transmission power of the UE and $M_{PUSCH,c}(i)$ represents a PUSCH transmission bandwidth in RBs.

$P_{O\_PUSCH,c}(j)$ is a PUSCH transmission power value that the eNB wants to receive. This value is determined to be the sum of a nominal power value $P_{O\_NOMINAL\_PUCCH}$ and $P_{O\_UE\_PUCCH}$. It is determined that j=0 in semi-persistent scheduling, j=1 in dynamic scheduling, and j=2 for a Random Access Response (RAR).

$\alpha_c(j) \cdot PL_c$ is a DL path loss value, where $PL_c$ is a value estimated by the UE and $\alpha_c(j)$ is a path loss compensation value indicated by higher-layer signaling. If j is 0 or 1, $\alpha_c \in \{0, 0.4, 0.5, 0.6, 0.7, 0.8, 0.9, 1\}$. If j is 1, $\alpha_c(j)=1$.

$\Delta_{TF,c}(i)$ is a value calculated using a value indicated by higher-layer signaling and the number of bits such as the number of Bits Per RE (BPRE), the number of bits in a CQI, or the number of bits in a PMI.

$f_c(i)$ is an accumulated value determined by a power value $\delta_{PUCCH}$ corresponding to the value of a TPC field included in a DCI format transmitted on a PDCCH, $K_{PUSCH}$ being a value determined by a Frequency Division Duplex (FDD) or Time Division Duplex (TDD) setting, and an accumulated value of the previous subframe, $f_c(i-1)$.

If PUCCH transmission is accompanied by PUSCH transmission, PUSCH power control is performed according to [Equation 4].

$$P_{PUSCH,c}(i) = \min\begin{Bmatrix} 10\log_{10}(P_{CMAX,c}(i) - P_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{[Equation 4]}$$

$\hat{P}_{CMAX,c}(i)$ is a value linear to $P_{CMAX,c}(i)$ and $\dot{P}_{PUCCH}(i)$ is a value linear to PUCCH power control determined by [Equation 2]. The other parameters have been described before.

Change of System Information

System information may be changed only in a specific radio frame. For this purpose, the concept of Modification Period (MP) is used. The same system information may be transmitted a plurality of times during an MP. The MP may be configured by system information. That is, the MP starts in a System Frame Number (SFN) satisfying SFN mod m=0 and signaled by a System Information Block (SIB). For example, the MP may be a multiple of 640 ms.

Figure 6:
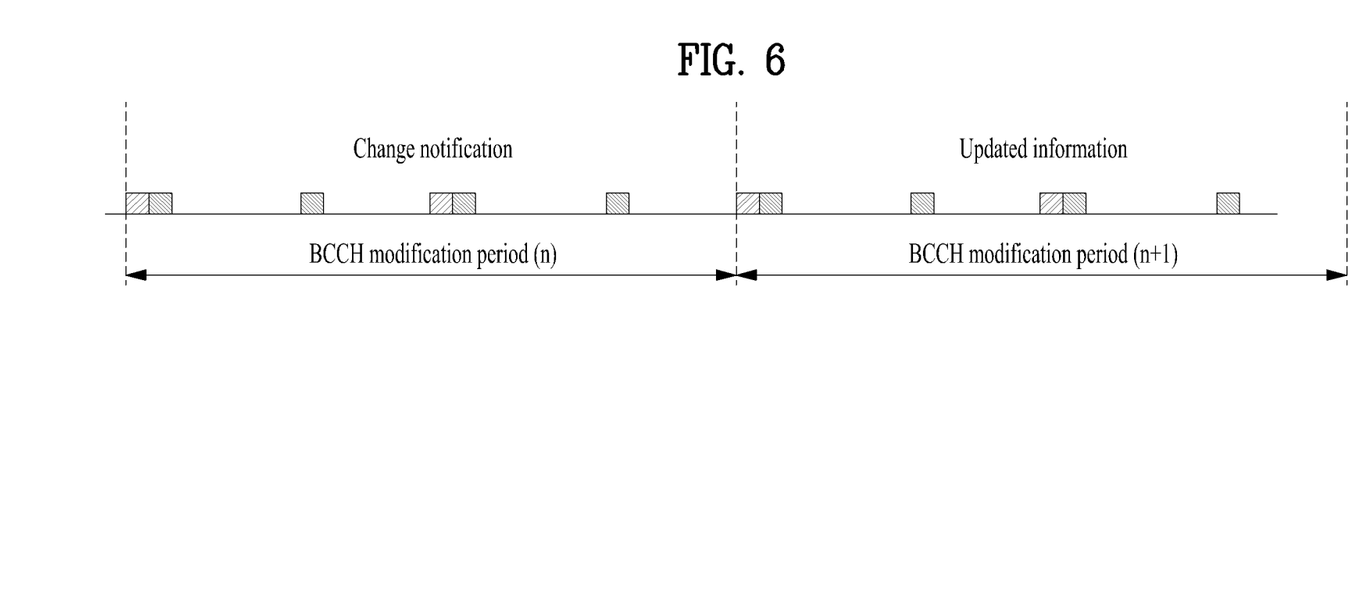
FIG. 6 is a view referred to for describing a change in system information.

FIG. 6 illustrates an operation for changing system information based on the concept of MP. Referring to FIG. 6, if the network determines to change system information, the network transmits a change notification on a paging channel during a specific MP (e.g., Broadcast Control Channel (BCCH) modification period (n)). Then, the network transmits updated system information in the next MP (e.g., BCCH modification period (n+1)). The same system information may be transmitted a plurality of times during an MP. In FIG. 6, different square boxes represent different system information.

Heterogeneous Deployments

Figure 7:
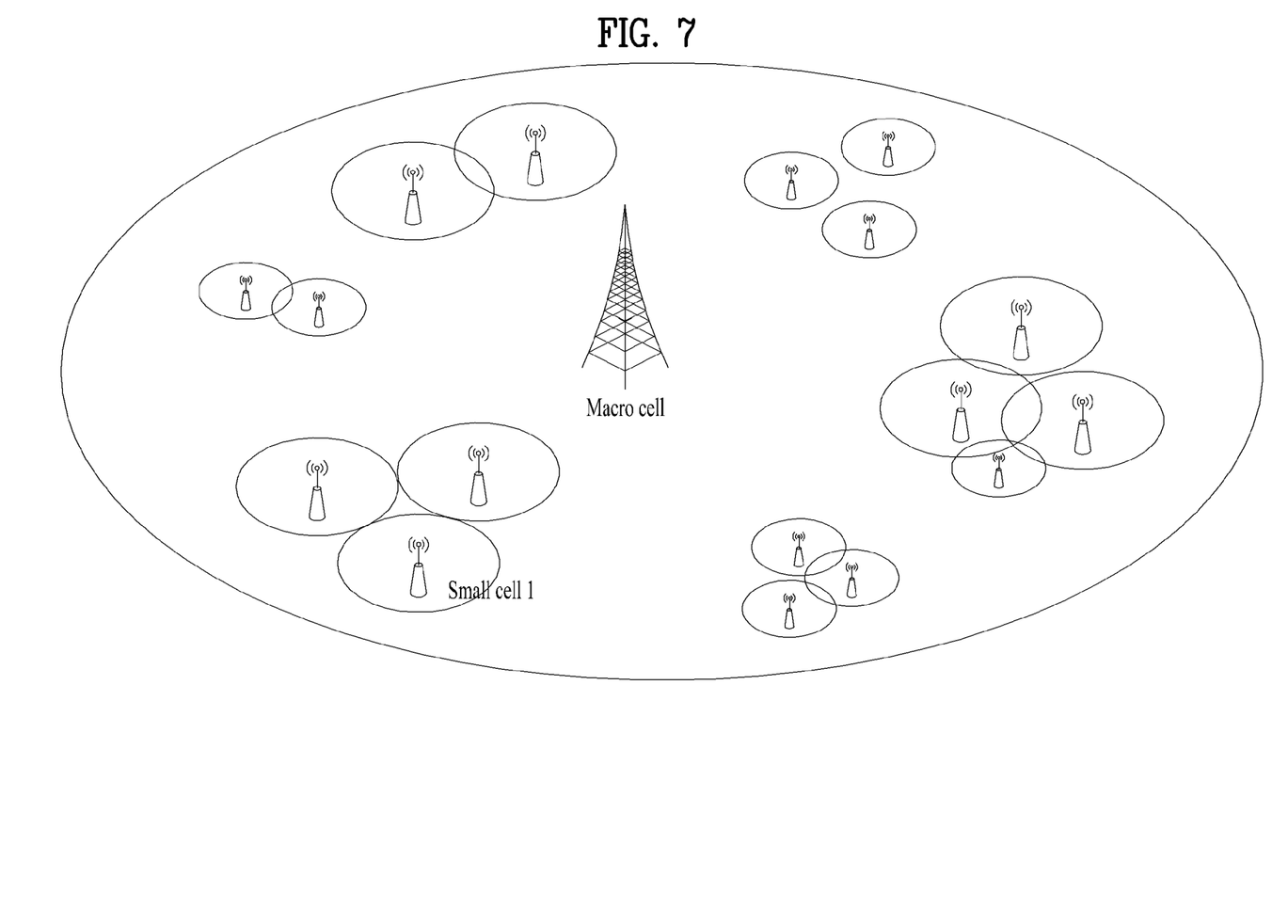
FIG. 7 is a view referred to for describing a heterogeneous network environment.

In a cellular mobile communication system, service capability per unit area has been increased by reducing a cell size and this trend will go on. Such a reduced cell may be generically referred to as a small cell. The term small cell may also be interchangeably used with micro cell, nano cell, pico cell, and femto cell. A small cell may be deployed in a hot spot zone in which users are concentrated, to thereby increase the service capability of the hot spot zone. In view of its small cell coverage, the small cell does not cover a whole area and thus UEs may experience frequent handover. Accordingly, small cells may be deployed with a macro cell, as illustrated in FIG. 7. An environment in which a macro cell co-exists with small cells as illustrated in FIG. 7 is called a heterogeneous network environment. Although a small cell and the macro cell may use the same frequency resources, they may also use different frequency resources. For example, the use frequencies of the macro cell and the small cell may be configured respectively as a primary cell and a secondary cell, that is, Carrier Aggregation (CA) may be used.

In the above heterogeneous network environment, an active UE is associated with a small cell with a low probability of 10 to 50%. Therefore, continuous turn-on of the small cell may be ineffective in terms of operation/power. Accordingly, the small cell may be turned on/off, when needed, for example, according to its load. However, abrupt turn-on/off of the small cell may cause a problem to system operation. More specifically, if the small cell is suddenly switched from an off state to an on state, the switching may cause severe interference to a neighbor UE serviced by a neighbor cell, resulting in call drop of the neighbor UE. On the other hand, if the small cell is suddenly switched from the on state to the off state, an active UE serviced by the small cell may experience call drop and UEs monitoring a paging channel of the small cell in an idle state may malfunction.

Accordingly, an embodiment of the present disclosure provides a method for changing transmission power gradually by a predetermined level during each predetermined time period in order to switch an eNB (small cell) from an on state to an off state or vice versa.

Change of Transmission Power for Cell on/Off

In the case of off-to-on switching in change of transmission power, the transmission power of an eNB may be increased from a minimum level to a maximum level during a predetermined time period. Likewise, in the case of on-to-off switching, the transmission power of the eNB may be decreased from the maximum level to the minimum level during a predetermined time period and then cell may be turned off. In other words, the eNB has maximum cell coverage available with the maximum transmission power and minimum cell coverage available with the minimum transmission power.

To switch the transmission power of the eNB to the off state, the transmission power of the eNB may be decreased gradually during a predetermined time period, minimizing the coverage of the eNB, as described above. During the operation, all UEs serviced by the eNB may perform handover to a neighbor cell. If the eNB is to be switched to the on state, the eNB may increase its transmission power, starting from the minimum transmission power to avoid sudden interference to neighbor UEs serviced by a neighbor eNB, thus increasing the coverage. During this operation, UEs serviced by the neighbor eNB may perform handover to the eNB switching to the on state.

The operation for gradually increasing/decreasing transmission power may be performed for a 'cell breathing' scheme that expands or shrinks cell coverage for load balancing with a neighbor cell as well as for cell on/off.

In a specific example of the above gradual transmission power change, the object of the change of the transmission power may be the Energy Per Resource Element (EPRE) of CRS/CSI-RS over which RSRP is measured, in the LTE/LTE-A system. In other words, the transmission EPRE of CRS/CSI-RS is increased/decreased by a predetermined level during each unit time. The unit time may be, but not limited to, 200 ms equal to an RSRP measurement unit time. Or the unit time may be an integer multiple of 200 ms. An increment/decrement for a gradual power change may be preset to 0.5 dBm, 1 dBm, etc. If the unit time and the increment/decrement are predetermined, one increment/decrement may be applied at the boundary between unit times or sequentially during a unit time. An eNB may change the transmission power of a DL signal/channel along with/in proportion to the change of the transmission power of an RS over which RSRP is measured.

Embodiments of Changing Transmission Power

The above-described (gradual) change of Transmission (Tx) power needs to be indicated appropriately to a UE. For this purpose, a method for indicating a Tx power change using a Tx power MP and a method for indicating a Tx power change by Radio Resource Control (RRC) signaling are provided according to embodiments of the present invention.

Tx power may be changed across a first time period (modification period (n)), a second time period (modification period (n+1)), and a third time period (modification period (n+2)). One thing to be noted herein is that an performing of actual Tx power change may be confined to the second time period.

The first time period is a time period during which Tx power change information indicating that Tx power will be changed in the next time period, that is, the second time period which is consecutive to the first time period is transmitted. In other words, an eNB may transmit Tx power change information including information (e.g., cell IDs) about eNBs whose Tx power will be changed during the second time period among eNBs listed in a neighbor cell list including the eNB and information about a power increment/decrement of the eNBs whose Tx power will be changed, to UEs during the first time period. The neighbor cells may include cells using the same and different frequencies as and from the serving cell. The Tx power change information may be transmitted on a paging channel. Each time period may be equal to a system information change period in size and a starting frame of each time period may satisfy SFN mod m=0. Or each time period may be different from the system information change period in size or may have an integer multiple of the size of the system information change period.

The Tx power change information indicating that Tx power will be changed may be transmitted repeatedly and/or periodically during the first time period. To reduce overhead, the Tx power change information may be configured to include only the cell IDs of eNBs having the same power increment/decrement. In this case, if two or more cells have different power increments/decrements, two or more pieces of Tx power change information need to be transmitted during the first time period. Then, the respective pieces of Tx power change information may be transmitted repeatedly at different intervals during the first time period.

The second time period is a time period during which the Tx power of a cell included in the Tx power change information is actually changed.

The third time period is a time period during which all increments/decrements included in the Tx power change information have been applied, that is, Tx power information has been updated.

FIG. 8 illustrates an embodiment of (gradually) changing Tx power during a Tx power change period. Referring to FIG. 8, an eNB transmits Tx power change information during the first time period (modification period (n)). When the Tx power of cells indicated by the Tx power change information is changed during the second time period (modification period (n+1)), the cells transmit signals at increased/decreased power levels during the third time period (modification period (n+2)).

A UE may receive the Tx power change information during the first time period. If the UE estimates a path loss during the second time period, the UE, which is aware that Tx power will be changed, may consider the Tx power change information in estimating the path loss. If the UE estimates the path loss without taking into account the Tx power change, the UE is highly likely to estimate a wrong path loss. For example, RSRP can be measured smaller than actual value when the UE estimate a path loss without considering serving cell which is decreasing TX power in the second time period. Therefore, the UE estimates that the path loss is large and the UE may perform a UL transmission by increasing its Tx power unnecessarily.

A path loss may be estimated by [Equation 5]

PL=referenceSignalPower−higher layer filtered RSRP [Equation 5]

In [Equation 5], PL represents an estimated path loss value, referenceSignalPower is a Tx power value of the eNB, indicated by higher-layer signaling, and higher layer filtered RSRP is a filtered value of RSRP measured every measurement unit time (200 ms).

The UE's estimation of a path loss in consideration of a power increase/decrease during the second time period may mean that the UE replaces referenceSignalPower indicated by higher-layer signaling in [Equation 5] with a value determined based on Tx power change information.

Further, the UE's estimation of a path loss in consideration of a power increase/decrease during the second time period may mean that the UE uses a different filter configuration for higher layer filtered RSRP described in [Equation 5] from a filter configuration used for path loss estimation during the first time period, that is, in the case of no power change. That is, different filter configurations may be used for a fixed power of an eNB and a variable power of an eNB and may be indicated to the UE individually.

Further, the UE's estimation of a path loss in consideration of a power increase/decrease during the second time period may mean that the UE uses a value corrected using Tx power change information as a filter input value for higher layer filtered RSRP Or the UE's estimation of a path loss in consideration of a power increase/decrease during the second time period may mean that the UE sets a filter coefficient for higher layer filtered RSRP in consideration of a Tx power change.

As described before, the UE may estimate a relatively exact path loss by taking into account a Tx power change, despite the Tx power change during the second time period.

The estimated path loss may be used for power control. If the UE is in an RRC connected state, UL power control may be related to a PUSCH and a PUCCH.

If the UE is in an RRC idle state, the UL power control may be related to the Tx power of a random access preamble on a Physical Random Access Channel (PRACH). The preamble Tx power $P_{PRACH}$ may be determined by [Equation 6]. Even though the Tx power is changed, a path loss $PL_c$ may be accurately estimated, thereby enabling accurate power control according to the embodiment of the present invention.

$$P_{PRACH}=\min\{P_{CMAX,c}(i), \text{PREAMBLE\_RECEIVED\_TARGET\_POWER}+PL_c\}$$ [Equation 6]

In the above equation, PREAMBLE_RECEIVED_TARGET_POWER is a value indicated by higher-layer signaling, and $P_{CMAX,c}(i)$ is the maximum Tx power of subframe i from serving cell c.

In addition to path loss estimation/Tx power control, the UE may perform RSRP prediction using Tx power change information. The UE may set a filter coefficient by considering that the Tx power of an eNB has been changed or may replace a previous filter input value with a compensated/corrected value in consideration of a power change, during the operation for calculating higher layer filtered RSRP. If the environment of the UE is not changed, the UE may predict an RSRP change. This RSRP prediction result may be used in triggering an event for RSRP reporting. That is, if the Tx power of a serving eNB is decreased, the UE may trigger RSRP reporting in advance based on an RSRP prediction result to thereby help the eNB to make a rapid decision on handover. Further, when the Tx power of a neighbor eNB is increased, the UE may trigger RSRP reporting in advance based on an RSRP prediction result to thereby help the eNB to make a rapid decision on handover. To help an eNB to make a rapid decision on handover, the UE may compare not an RSRP measurement of an eNB whose Tx power is increased/decreased during immediate previous 200 ms but a predicted RSRP of the eNB after X ms with an event triggering threshold and use the comparison result in generating a reporting event. Or the UE may report the RSRP predicted to be after the X ms. In another implementation method, an event triggering threshold for RSRP reporting over an eNB with an increased/decreased Tx power may be set to be different from a threshold for a general case.

The eNB may indicate a Tx power change to the UE by RRC signaling. For the purpose, at least one of i) a starting time and an ending time, ii) an initial Tx power and a final Tx power, (iii) a unit time, iv) a power increment or decrement or a power variation, and v) a power increase/decrease indicator may be transmitted to the UE by RRC signaling. If a part of the above information, for example, the unit time is preset between the UE and the eNB, the partial information may be excluded from the signaling. In addition, information that may be derived from other information may be excluded from the signaling.

Since RSRP measurement should be performed over a neighbor eNB as well as a serving eNB, the eNB should provide Tx power change information about the neighbor eNB as well as Tx power change information about the eNB to a UE serviced by the eNB. The Tx power change information about the neighbor eNB includes i) a starting time and an ending time, ii) an initial Tx power and a final Tx power, (iii) a unit time, iv) a power increment or decrement or a power variation, and v) a power increase/decrease indicator, like the Tx power change information about the serving eNB. However, to reduce signaling overhead, absolute power information such as the initial Tx power and the final Tx power may be omitted because the UE does not estimate a path loss with the neighbor eNB.

When transmitting a neighbor eNB list over which RSRP should be measured to the UE, the serving eNB may also transmit Tx power change information about each eNB. The neighbor eNB list may be a physical cell ID list in the case of CRS-based RSRP measurement or multiple CSI-RS configurations in the case of CSI-RS-based RSRP measurement. To support inter-frequency measurement, the neighbor eNB list may be a list of cells having different frequency bands or may include multiple CSI-RS configurations of different frequency bands.

Upon receipt of the above RRC signaling, the UE may perform path loss estimation, Tx power control, and RSRP measurement, taking into account the above information during a power change period, as described before.

Figure 9:
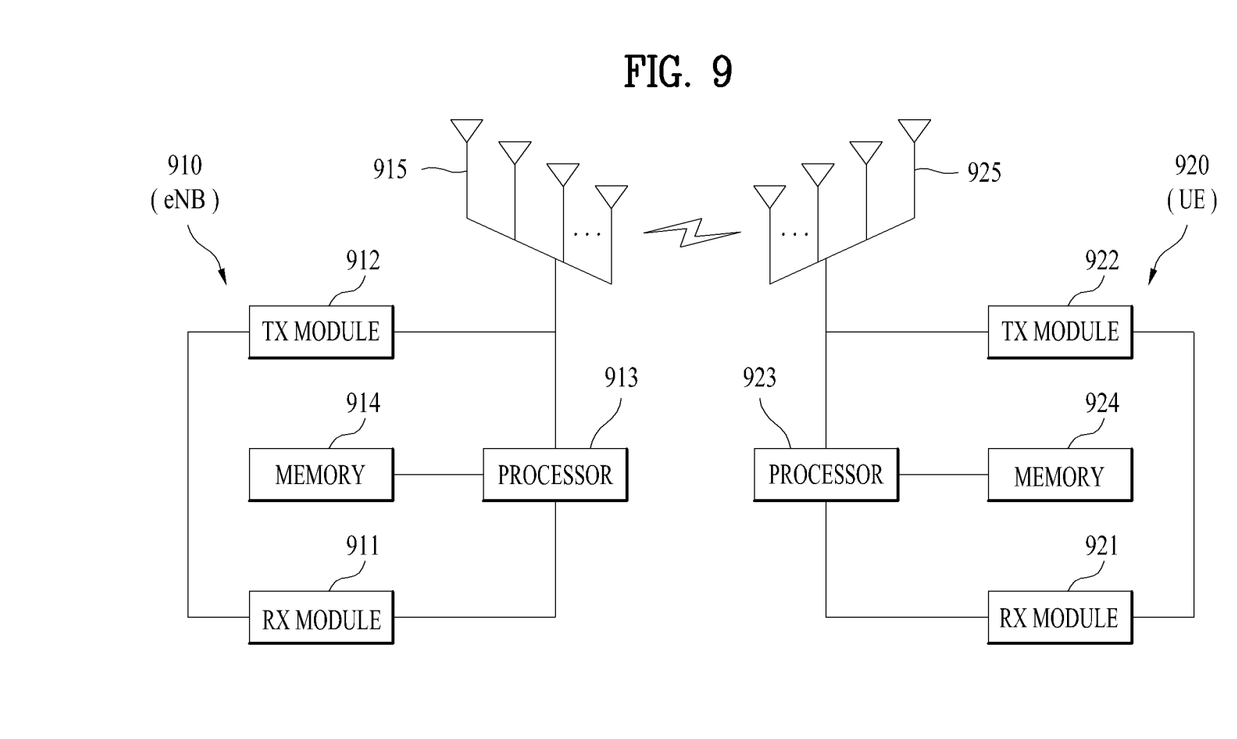
FIG. 9 is a block diagram of a transmission apparatus and a reception apparatus.

FIG. 9 is a block diagram of an eNB and a UE according to an embodiment of the present invention.

Referring to FIG. 9, an eNB 910 according to the present invention may include a Reception (Rx) module 911, a Tx module 912, a processor 913, a memory 914, and a plurality of antennas 915. The presence of the plurality of antennas 915 means that the eNB 910 supports Multiple Input Multiple Output (MIMO) transmission and reception. The Rx module 911 may receive UL signals, data, and information from a UE. The Tx module 912 may transmit DL signals, data, and information to a UE. The processor 913 may provide overall control to the eNB 910.

The processor 913 of the eNB 910 according to an embodiment of the present invention may perform operations needed to implement the afore-described various embodiments.

Besides, the processor 913 of the eNB 910 computes and processes information received by the eNB 910 and information to be transmitted to the outside. The memory 914 may store the computed and processed information for a predetermined time and may be replaced by a component such as a buffer (not shown).

Referring to FIG. 9 again, a UE 920 according to the present invention may include an Rx module 921, a Tx module 922, a processor 923, a memory 924, and a plurality of antennas 925. The presence of the plurality of antennas 925 means that the UE 920 supports MIMO transmission and reception. The Rx module 921 may receive DL signals, data, and information from an eNB. The Tx module 922 may transmit UL signals, data, and information to an eNB. The processor 923 may provide overall control to the UE 920.

The processor 923 of the UE 920 according to an embodiment of the present invention may perform operations needed to implement the afore-described various embodiments.

Besides, the processor 923 of the UE 920 computes and processes information received by the UE 920 and information to be transmitted to the outside. The memory 924 may store the computed and processed information for a predetermined time and may be replaced by a component such as a buffer (not shown).

The specific configurations of the above-described eNB and UE may be implemented so that the foregoing various embodiments of the present invention may be applied independently or two or more of them may be applied simultaneously. To avoid redundancy, the same description is not provided herein.

In the description of FIG. 9, the description of the eNB 910 is applicable to a relay serving as a DL transmitter or a UL receiver, and the description of the UE 920 is applicable to a relay serving as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to various mobile communication systems.

The invention claimed is:
1. A method for controlling transmission power by a User Equipment (UE) in a wireless communication system, the method comprising:
receiving transmission power change information during a first time period; and
estimating a path loss and performing uplink transmission power control using the estimated path loss,
wherein if the path loss estimation is performed during a second time period successive to the first time period, the transmission power change information is considered in the path loss estimation, and wherein the path loss is estimated by the following equation, path loss (PL)=referenceSignalPower−higher layer filtered reference signal received power (RSRP), where the referenceSignalPower is a transmission power of a base station (BS) and the higher layer filtered RSRP is a filtered value of an RSRP measured every RSRP measurement unit time.

2. The method according to claim 1, wherein the transmission power change information includes cell Identifiers (IDs) of one or more cells having transmission power to be changed and power increments/decrements corresponding to the cell IDs.

3. The method according to claim 1, wherein the second time period is a time period during which transmission power of a cell indicated by the transmission power change information is changed.

4. The method according to claim 1, wherein the first time period is a time period during which the transmission power change information is transmitted repeatedly.

5. The method according to claim 1, wherein referenceSignalPower is a value indicated by higher-layer signaling and if the path loss estimation is performed during the second time period, the value indicated by the higher-layer signaling is replaced with a value determined according to the transmission power change information.

6. The method according to claim 1, wherein if the path loss estimation is performed during the second time period, a filter configuration for higher layer filtered RSRP is different from a filter configured used when the path loss estimation is performed during the first time period.

7. The method according to claim 1, wherein if the path loss estimation is performed during the second time period, a filter input value for higher layer filtered RSRP is a value corrected using the transmission power change information.

8. The method according to claim 1, wherein if the UE is in a Radio Resource Control (RRC) connected state, the uplink transmission power control is related to one or more of a Physical Uplink Shared Channel (PUSCH) and a Physical Uplink Control Channel (PUCCH).

9. The method according to claim 1, wherein if the UE is in an RRC idle state, the uplink transmission power control is related to transmission power of a preamble on a Physical random Access Channel (PRACH).

10. The method according to claim 1, wherein the transmission power change information is transmitted on a paging channel during the first time period.

11. The method according to claim 1, wherein a transmission power change indicated by the transmission power change information is a change of Energy Per Resource Element (EPRE) of a Reference Signal (RS) over which the RSRP is to be measured.

12. The method according to claim 1, wherein a transmission power change indicated by the transmission power change information is proportional to a change of Energy Per Resource Element (EPRE) of a Reference Signal (RS).

13. The method according to claim 1, wherein each of the first and second time periods is an integer multiple of a system information change period.

14. A User Equipment (UE) in a wireless communication system, the UE comprising:
a reception module; and
a processor,
wherein the processor is configured to:
receive transmission power change information during a first time period, and
estimate a path loss and performing uplink transmission power control using the estimated loss,
wherein if the path loss estimation is performed during a second time period successive to the first time period, the processor considers the transmission power change information in the path loss estimation, and
wherein the path loss is estimated by the following equation, path loss (PL)=referenceSignalPower−higher layer filtered reference signal received power (RSRP), where the referenceSignalPower is a transmission power of a base station (BS) and the higher layer filtered RSRP is a filtered value of an RSRP measured every RSRP measurement unit time.

\* \* \* \* \*